US012460830B2

(12) United States Patent
Gerstenmeier

(10) Patent No.: US 12,460,830 B2
(45) Date of Patent: Nov. 4, 2025

(54) DUAL HEATING OR COOLING SYSTEM AND ITS USE

(71) Applicant: JK-HOLDING GmbH, Windhagen (DE)

(72) Inventor: Jürgen Gerstenmeier, Windhagen (DE)

(73) Assignee: JK-Holding GMBH, Windhagen (DE)

( * ) Notice: Subject to any disclaimer, the term of this patent is extended or adjusted under 35 U.S.C. 154(b) by 933 days.

(21) Appl. No.: 17/425,093

(22) PCT Filed: Jan. 23, 2020

(86) PCT No.: PCT/EP2020/051588
§ 371 (c)(1),
(2) Date: Jul. 22, 2021

(87) PCT Pub. No.: WO2020/152251
PCT Pub. Date: Jul. 30, 2020

(65) Prior Publication Data
US 2022/0107099 A1    Apr. 7, 2022

(30) Foreign Application Priority Data
Jan. 23, 2019 (CH) .................................. 00075/19

(51) Int. Cl.
*F24F 5/00* (2006.01)
*A61N 5/00* (2006.01)
*A61N 5/06* (2006.01)

(52) U.S. Cl.
CPC ...... *F24F 5/0042* (2013.01); *A61N 2005/007* (2013.01); *A61N 5/0614* (2013.01)

(58) Field of Classification Search
CPC .............................. F24F 5/0042; A61N 5/0614
(Continued)

(56) References Cited

U.S. PATENT DOCUMENTS 5,228,923 A * 7/1993 Hed ....................... H10N 10/17
136/203
5,367,890 A    11/1994 Doke
(Continued)

FOREIGN PATENT DOCUMENTS

DE        3915574 A1    11/1990
DE    102005040821 A1    3/2007
(Continued)

OTHER PUBLICATIONS

International Search Report and Written Opinion of the International Searching Authority for International Application No. PCT/EP2020/051588 mailed Mar. 24, 2022.

*Primary Examiner* — Joel M Attey
(74) *Attorney, Agent, or Firm* — HESLIN ROTHENBERG FARLEY & MESITI P.C.

(57) ABSTRACT

The present invention relates to a radiation-emitting device (100), comprising at least one radiation source (110) configured to emit radiation of at least one wavelength towards a target (190) or towards a subject (192); at least one space or surface (140) configured to place the target (190) or the subject (192) therein or thereon; at least one means (185) configured to control the at last one radiation source's radiation emission towards the target (190) or towards the subject (192); wherein the radiation-emitting device (100) further comprises: at least one dual heating or cooling system (170) configured to heat or to cool the at least one space or surface (140) and comprising a Peltier device (171), said Peltier device (171) comprising at least two cuboids (172, 172') made of two semiconductor materials having different electron densities, said at least two cuboids (172, 172') being placed thermally in parallel to each other and electrically in series, interconnected with thermally conducting metal bridging plates (173, 173') and sandwiched
(Continued)

between a non-conducting material reduced temperature cover plate (174) and a non-conducting material elevated temperature cover plate (174') and configured to be supplied with DC electric current via electrical connections (179); at least one first heat exchanger (175) thermally connected as a heat source to the Peltier device's (171) reduced temperature cover plate (174); at least one second heat exchanger (176) thermally connected as a heat sink to the Peltier device's (171) elevated temperature cover plate (174'); at least one fan or fan assembly (177, 178) configured to cause environmental air to flow along the at least one heat exchanger (175, 176); at least one nozzle (180) configured to pass and direct the environmental air flow having passed the at least one first and/or second heat exchanger (175, 176) and heated or cooled towards the at least one space or surface (140) configured to place the target (190) or the subject (192) therein or thereon; and at least one means (181) configured to control the DC electric current supply to the Peltier device (171). The invention also relates to a dual heating or cooling system, to the use of the dual heating or cooling system in a radiation-emitting device and a method of alternatingly heating or cooling areas or parts of a radiation-emitting device (100) before, during or after a radiation-emitting operation of said radiation-emitting device (100).

6 Claims, 3 Drawing Sheets

(58) Field of Classification Search
USPC .................................................. 62/3.1, 3.2
See application file for complete search history.

(56) References Cited

U.S. PATENT DOCUMENTS

| | | | |
|---|---|---|---|
| 6,385,976 B1 | 5/2002 | Yamamura et al. | |
| 2002/0029071 A1* | 3/2002 | Whitehurst | A61N 5/062 607/90 |
| 2002/0120312 A1 | 8/2002 | Ignatius et al. | |
| 2004/0155251 A1 | 8/2004 | Abramov et al. | |
| 2004/0225339 A1 | 11/2004 | Yaroslavsky et al. | |
| 2005/0126184 A1* | 6/2005 | Cauchy | F25B 21/02 62/3.3 |
| 2005/0143793 A1* | 6/2005 | Korman | A61N 5/0616 607/94 |
| 2007/0007470 A1 | 1/2007 | Kratz | |
| 2007/0035253 A1* | 2/2007 | Mewissen-Scholberg | H05B 35/00 315/159 |
| 2007/0074470 A1 | 4/2007 | Bendrell | |
| 2009/0084112 A1 | 4/2009 | Ham | |
| 2011/0314837 A1* | 12/2011 | Parish | F24F 5/0096 62/3.4 |
| 2013/0018442 A1 | 1/2013 | Irwin et al. | |
| 2013/0174577 A1* | 7/2013 | Brija | F25B 21/04 62/3.2 |
| 2013/0184693 A1 | 7/2013 | Neev | |
| 2013/0234041 A1* | 9/2013 | Deal | A61L 2/08 250/455.11 |
| 2014/0007594 A1* | 1/2014 | Lofy | H05K 7/20209 62/3.2 |
| 2014/0236265 A1 | 8/2014 | O'Neil et al. | |
| 2015/0184693 A1 | 7/2015 | Neev | |
| 2017/0312540 A1 | 11/2017 | Gustavsson | |
| 2018/0236254 A1 | 8/2018 | Shwarz et al. | |

FOREIGN PATENT DOCUMENTS

| | | |
|---|---|---|
| DE | 102006021829 A1 | 11/2007 |
| DE | 102015014453 A1 | 5/2017 |
| EP | 0924481 A1 | 6/1999 |
| JP | H1123091 A | 1/1999 |
| JP | 2002065875 A | 3/2002 |
| JP | 2005506894 A | 3/2005 |
| JP | 2012196988 A | 10/2012 |
| JP | 2013149524 A | 8/2013 |
| JP | 2018004669 A | 1/2018 |
| WO | 2011016876 A1 | 2/2011 |

* cited by examiner

DUAL HEATING OR COOLING SYSTEM AND ITS USE

This application is a national stage entry under 35 U.S.C. § 371 of International Application Number PCT/EP2020/051588, filed Jan. 23, 2020, and claims priority to Swiss applica-tion CH 00075/19, filed Jan. 23, 2019, the entire contents of which applications are hereby incorporated herein in their entireties.

The present invention relates to a dual heating or cooling system. In particular, the present invention relates to a system which, depending upon the electric voltage applied to the system, and consequently upon an electric current flowing through the system, allows a transfer of heat from one side of the system to the other side thereof. Practically, if a voltage is applied to the system, heat is transferred from one side of the system to the other, thereby creating a temperature gradient caused by charge carriers in the material of a thermocouple diffusing from the elevated temperature side of the thermocouple to the reduced temperature side thereof.

The present invention also relates to a radiation-emitting apparatus, as for example a body irradiation apparatus, non-restricting examples of which are tanning beds, tanning booths or other apparatus irradiating useful radiation onto a subject as, for example, a human or animal body, said apparatus comprising a dual heating or cooling system configured to transfer heat from a heat-emitting appliance, e.g. a heat source, of the radiation-emitting apparatus to a heat sink providable as a component of the radiation-emitting apparatus.

The present invention also relates to the use of a dual heating or cooling system configured to effect heating or cooling to areas or parts of a radiation-emitting apparatus where heating or cooling is required or desired.

Finally, the invention relates to a method of heating or cooling areas or parts of a radiation-emitting apparatus during a radiation-emitting operation thereof.

A Peltier device (also called "Peltier cooler" or "Thermo-Electric Cooler" (TEC)) is a solid state active heat pump in a basically sandwich-type shape (see FIG. 1 (https://en.wikipedia.org/wiki/thermoelectric_cooling)): Two or more cuboids made of two different semiconductor materials, one of them p-type, the other one n-type (as non-restricting examples: bismuth telluride; silicon germanium), are sandwiched, thermally in parallel to each other and in pairs connected electrically in series by conductive metal bridges, between two non-conducting plates (as non-restricting example: made of alumina ceramics). Applying a voltage to electrical connections at the free ends of the semiconductor cuboid pair(s) causes a DC current to flow across the junction of the semiconductors, resulting into a temperature difference between the sandwiching plates of the Peltier device. In the cooling mode of the Peltier device, the reduced temperature ceramic plate, which is attached to a heat exchanger/heat source to be cooled, absorbs heat, which is transferred to the elevated temperature ceramic plate, which is attached to a heat exchanger/heat sink, where the heat is dissipated. When changing the DC current flow direction, the Peltier device—in the heating mode—supplies heat from the elevated temperature ceramic plate to the reduced temperature ceramic plate and from there via the connected heat exchanger to the space or surface or part to be heated.

Cooling or heating by means of a Peltier device is considered favorable in view of the easy controllability by changing the input voltage or current, in view of the exactness of the temperature control within fractions of degrees, in view of the high shape flexibility of Peltier devices (which may be configured in any shape and size required for a specific application) and in view of the Peltier device's reliability (no moving parts, maintenance rarely required).

Radiation-emitting apparatus, as for example body irradiation apparatus, non-restricting examples of which are tanning beds or tanning booths or other apparatus irradiating useful radiation onto a subject as, for example, a human or animal body, are operated by providing a place for a subject as for example a person wanting to receive a radiation treatment in a standing position in an irradiation treatment booth (e. g. in a tanning booth) or in a recumbent position on an irradiation treatment bed (e. g. on a tanning bed), and irradiating radiation of a wavelength or of a wavelength range or of a wavelength band suitable for the desired or intended radiation treatment onto said subject or person in a suitable intensity and for an appropriate time.

In the context of the present invention, as also in the context of the relevant prior art, the term "radiation-emitting apparatus" or "radiation-emitting device" is understood to mean apparatus and devices configured to emit radiation of one wavelength of the actinic spectrum, or radiation of a plurality of wavelengths or of a wavelength band of the actinic spectrum comprising more than one, several or plural wavelengths onto the body, or to parts of a body, of a subject, for example (but not restricting to) a human or an animal exposed to such radiation.

The type of radiation irradiated by the radiation-emitting apparatus is not restricted in the context of the present invention (in the same way as in a consideration of relevant prior art) and may be, for example and not restricting, UV radiation (UV-A radiation and/or UV-B radiation and or UC-C radiation), visible light radiation, IR radiation (near IR radiation, far IR radiation). Corresponding to the wavelength or wavelength range or wavelength band of the irradiated radiation, the radiation-emitting apparatus may comprise, as the radiation-emitting source, high-pressure lamps, medium pressure lamps, low-pressure lamps, and/or LEDs in the form of single LEDs or LED arrays (i. e. LEDs configured to emit radiation of one or two or several wavelengths, wavelength ranges or wavelength bands of the UV, visible and IR ranges), or may comprise combinations of the aforementioned radiation-emitting sources.

Similarly, for the understanding of the term "radiation emitting apparatus" or "radiation-emitting device", the purpose of irradiating radiation onto the subject's body is not restricted. The purpose may be a medical purpose or a non-medical purpose, for example a cosmetic purpose or a wellness purpose. Non-restricting examples are radiation-emitting apparatus or devices for tanning the subject's body, for initiating the Vitamin D3 generation in the subject's body, for initiating the collagen, keratin and hyaluronic acid generation in the skin of the subject's body, for effecting a skin treatment, including a treatment of curing one disease or several diseases of the skin or for directly curing one or several diseases having the same etiology or having different etiologies of the subject's body, for effecting a photodynamic therapy for treating one specific disease or certain diseases of the subject's body; etc. The above enumerative description is not exhaustive and does not restrict the invention.

At the beginning of the irradiating treatment for any one of more of the above purposes, the treatment booth (e. g. the tanning booth) wherein the subject or person is standing, or the treatment bed (e. g. the tanning bed) on which the subject or person is lying, is often felt by the subject or person to be treated to be uncomfortably cool. Hence, a step of preheating the space or surface in/on which the subject or person intends to stand or lie would be appreciated. In the prior art, body irradiating apparatus were equipped with a heating device allowing to achieve a comfortable temperature of the space or surface for accommodating the subject or person to be irradiated. Such a heating device, for example a heating fan assembly, not only required a more complicated, and in many cases also a considerably larger, space-filling, configuration of the irradiation device, but also had to be supplied with large amounts of energy for the blowing-heating step.

On the other hand, once the irradiation process is started, a considerable amount of the energy irradiated onto the person standing in the irradiation space of the tanning booth or lying on or below the irradiation surface of the tanning bed is emitted by the radiation sources in the form of heat. Such heat emitted by the radiation sources has to be dissipated in order to create a comfortable climate for the subject or person receiving the radiation treatment. In the prior art, the excess heat is removed from the radiation space or radiation-exposed surface(s) by one or more suitable temperature-conditioning (e. g. air-conditioning) devices optionally provided with one or more suitable blower(s). While the heat dissipated into the environment can create a comfortable climate to the user of the irradiation device, the heat is discarded and cannot be used expediently.

Moreover, the steps of heating and cooling the treatment space or treatment surface in a radiation-emitting device could not be effected by the same system of the radiation-emitting device.

In view of the above deficits, it was an object of the invention that disadvantages of the temperature management of radiation sources in the treatment space or on the treatment surface be remedied.

As one object of the invention, it was intended that the steps of heating and cooling the treatment space or treatment surface or parts of a radiation-emitting apparatus be effected by the same system allowing a dual heating or cooling mode operation dependent upon the physical operation conditions thereof.

It was another object of the invention that a temperature control and temperature adjustment be effected more promptly and more exactly than in customary systems. Another object was the intention that the heating and cooling efficiency of a dual heating or cooling system be improved by generating just that heating (or cooling) efficiency required under the circumstances and by "transporting" the heat along distances only such short that heat losses be avoided.

It was still another object of the invention that a dual heating or cooling system be provided which is small enough to be installed in narrow spaces and not as voluminous as conventional heat-conditioning (heating or cooling) devices, thereby granting construction designers more freedom in positioning a required heating or cooling system.

As one further object of the invention, it was intended that a temperature of the radiation treatment space or surface comfortable for the user of a body irradiation apparatus be adjusted before the start of the irradiation procedure with a straightforward and energy efficient heating installation.

It was another object of the invention that excess heat generated by the radiation sources in the course of the irradiation procedure be dissipated easily by an efficient cooling device.

It was now found by the inventors that the above deficits could be remedied, and objects can be achieved, by the dual heating or cooling system of the present invention and by using such a dual heating or cooling system of the invention as a component of a radiation-emitting device.

Hence, the invention relates to a radiation-emitting device, comprising
a. at least one radiation source configured to emit radiation of at least one wavelength towards a target or towards a subject;
b. at least one space or surface configured to place the target or the subject therein or thereon.
wherein the radiation-emitting device further comprises:
c. at least one dual heating or cooling system configured to heat or to cool the at least one space or surface and comprising
a Peltier device comprising at least two cuboids made of two semiconductor materials having different electron densities, said at least two cuboids being placed thermally in parallel to each other and electrically in series, interconnected with thermally conducting metal bridging plates and sandwiched between a non-conducting material reduced temperature cover plate and a non-conducting material elevated temperature cover plate and configured to be supplied with DC electric current via electrical connections;
at least one first heat exchanger thermally connected as a heat source to the Peltier device's reduced temperature cover plate;
at least one second heat exchanger thermally connected as a heat sink to the Peltier device's elevated temperature cover plate;
at least one fan or fan assembly configured to cause environmental air to flow along the at least one first and/or second heat exchanger;
at least one nozzle configured to pass and direct the environmental air flow having passed the at least one first and/or second heat exchanger and thereby heated or cooled towards the at least one space or surface configured to place the target or the subject therein or thereon; and
at least one means configured to control the DC electric current supply to the Peltier device.

In another aspect, the invention relates to a dual heating or cooling system comprising
a Peltier device comprising at least two cuboids made of two semiconductor materials having different electron densities, said at least two cuboids being placed thermally in parallel to each other and electrically in series, interconnected with thermally conducting metal bridging plates and sandwiched between a non-conducting material reduced temperature cover plate and a non-conducting material elevated temperature cover plate and configured to be supplied with DC electric current via electrical connections;
at least one first heat exchanger thermally connected as a heat source to the Peltier device's reduced temperature cover plate;
at least one second heat exchanger thermally connected as a heat sink to the Peltier device's elevated temperature cover plate;
at least one fan or fan assembly configured to cause environmental air to flow along the at least one first and/or second heat exchanger;
at least one nozzle configured to pass and direct an environmental air flow having passed the at least one first and/or second heat exchanger and thereby heated or cooled towards a target or a subject; and at least one means configured to control the DC electric current supply to the Peltier device.

In a further aspect, the invention also relates to the use of a dual heating or cooling system for effecting heating or cooling to areas or parts of a radiation-emitting apparatus where heating or cooling is required or desired, i. e. a use of a dual heating or cooling system as claimed and described in detail in the specification below in a radiation-emitting device for providing alternatingly heating or cooling to at least one space or surface of a radiation-emitting device configured to place a target or a subject therein or thereon intended to be subjected to radiation.

Finally, the invention relates to a method of alternatingly heating or cooling areas or parts of a radiation-emitting device before, during or after a radiation-emitting operation of said radiation-emitting device, said method comprising the alternative steps:

a. of heating at least one space or surface of the radiation-emitting device by operating a dual heating or cooling system as claimed and described in detail in the specification below and comprised by said radiation-emitting device through supplying DC electric current to the electrical connections of the Peltier device and dissipating the heat from the elevated temperature cover plate of the Peltier device to the radiation-emitting device; or b. of cooling at least one space or surface of the radiation-emitting device by operating a dual heating or cooling system as claimed and described in the specification below through supplying DC electric current to the electrical connections of the Peltier device in a current flow direction opposite to the flow direction of the heating step and transferring the heat from the radiation-emitting device to the reduced temperature cover plate of the Peltier device.

The invention is further explained in detail by referring to the Figures, wherein.

In the following detailed description, reference is made to the invention in general and to preferred embodiments thereof, of which several are also shown in the Figures. When referring to these preferred embodiments in the description and in the Figures, such reference is intended to be presented as an attempt to allow a better understanding of the invention. In any case, such reference or references to preferred embodiments should not be construed to restrict the invention.

Figure 1:
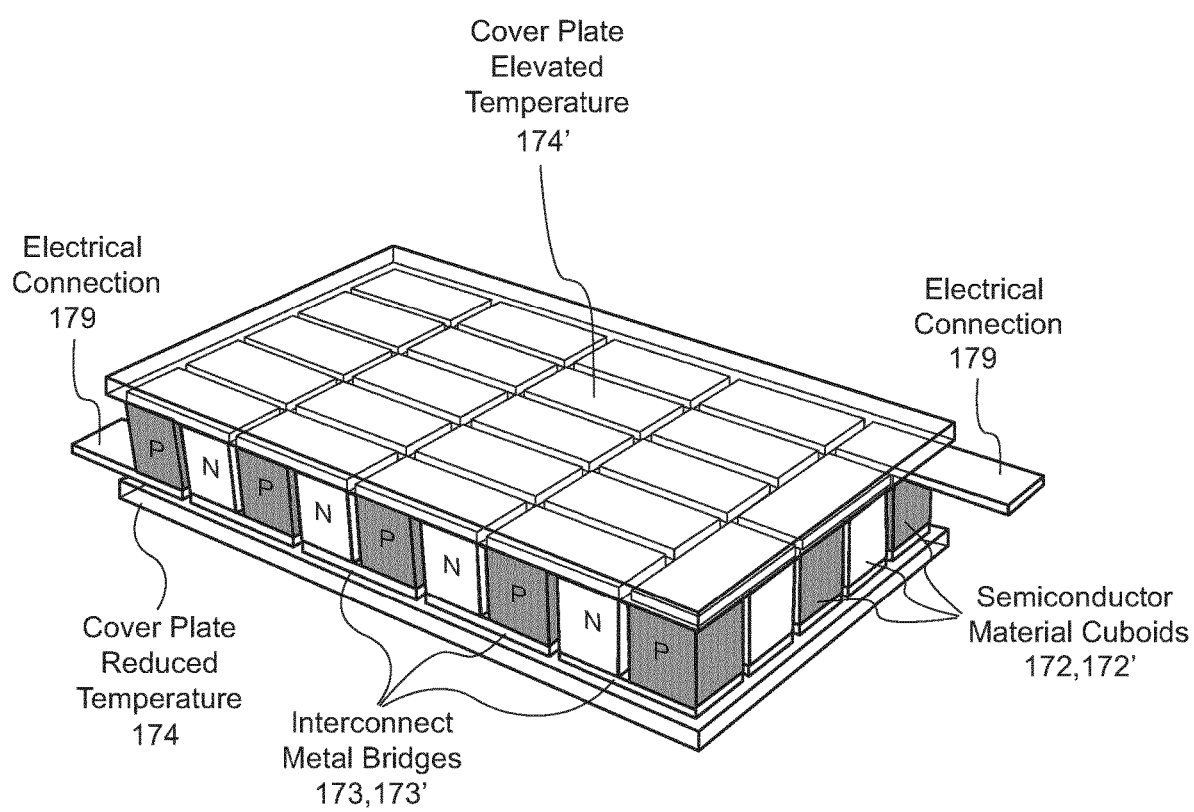
FIG. 1 is a schematic perspective view of a Peltier device or thermoelectric cooler (TEC) as derived from https://en.wikipedia.org/wiki/thermoelectric_cooling.
Figure 2:
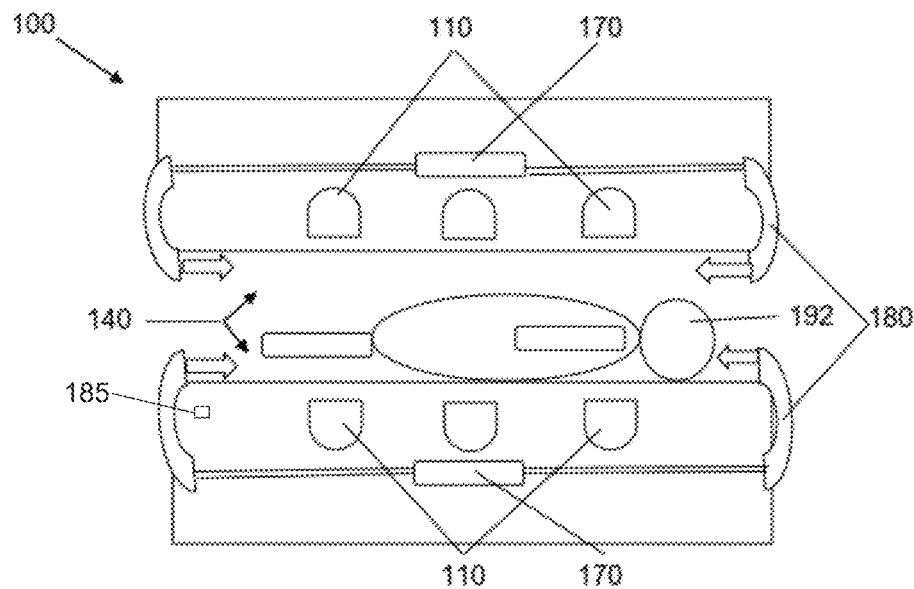
FIG. 2 is a schematic side view of one exemplary and non-restricting embodiment of the radiation-emitting device of the invention comprising a dual heating or cooling system comprising a Peltier device or thermoelectric cooler (TEC)
Figure 4:
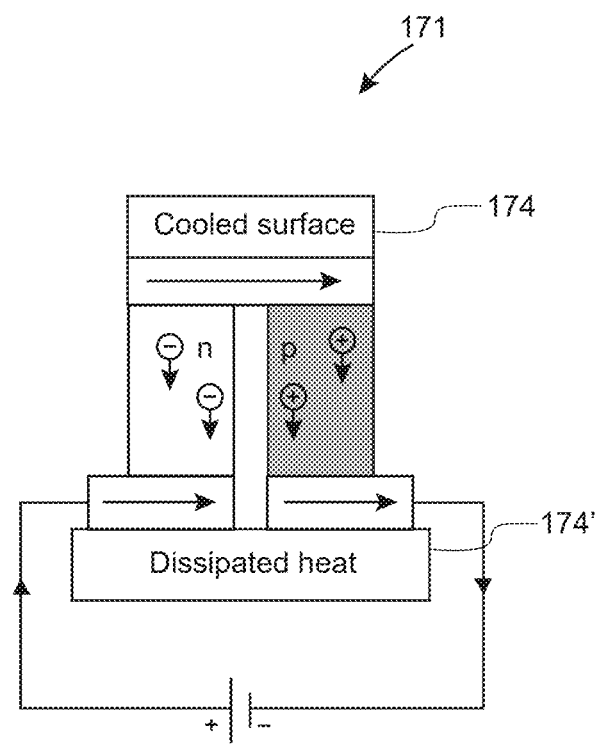
FIG. 4 is an exemplary schematic view showing an exemplary and non-restricting embodiment of a circuit of a Peltier device (thermoelectric cooler, TEC), derived from https://en.wikipedia.org/wiki/Thermoelectric_effect#Peltier_effect.
Figure 3:
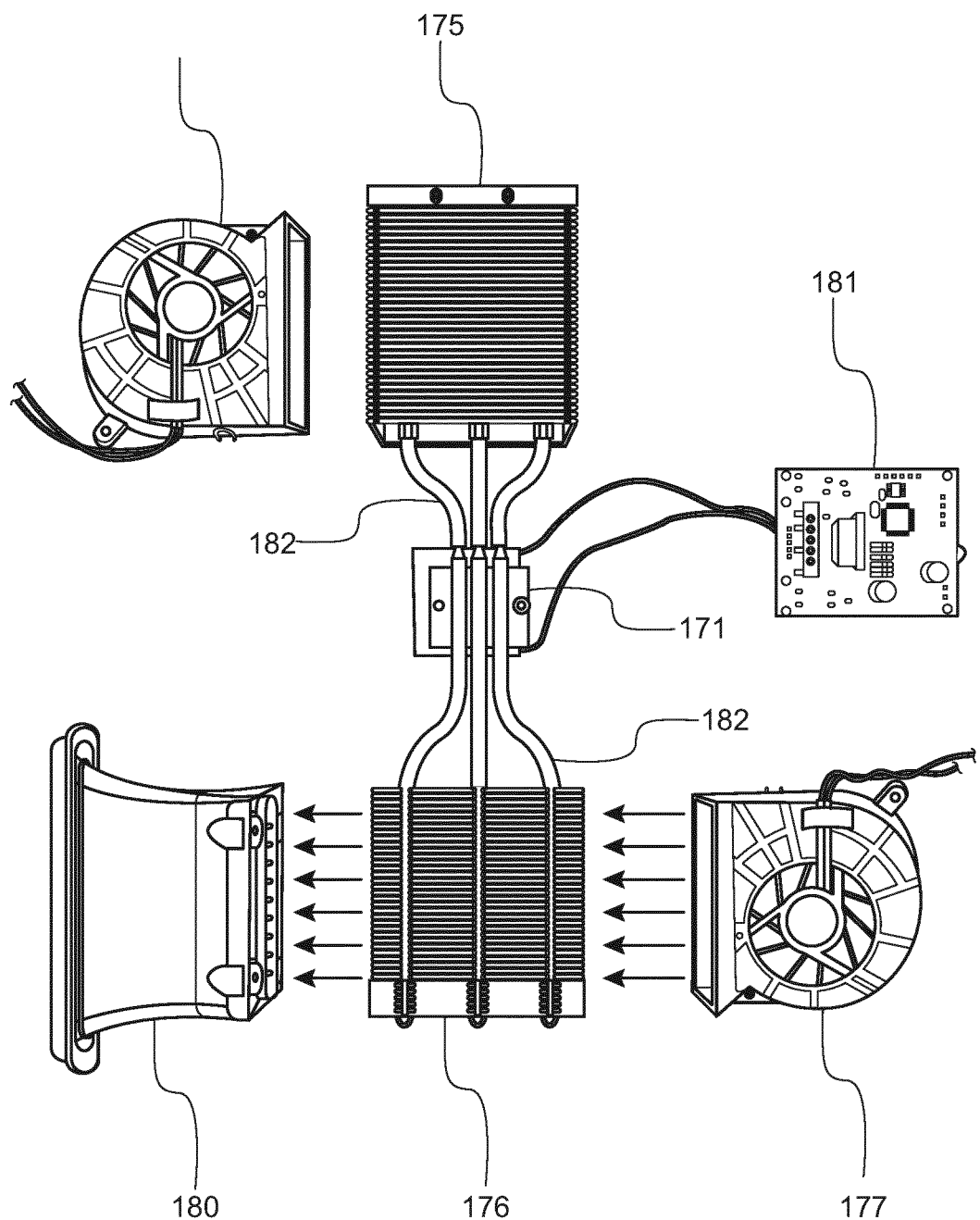
FIG. 3 is a top view to one exemplary and non-restricting embodiment of a dual heating or cooling system of the invention.

The invention is first explained by exemplarily referring to the Figures. FIG. 1 is a schematic perspective view of a Peltier device or thermoelectric cooler (TEC) as derived from https://en.wikipedia.org/wiki/thermoelectric_cooling. FIG. 2 is a schematic side view of one exemplary and non-restricting embodiment of the radiation-emitting device of the invention comprising a dual heating or cooling system comprising a Peltier device or thermoelectric cooler (TEC). FIG. 3 is a top view to one exemplary and non-restricting embodiment of a dual heating or cooling system of the invention. FIG. 4 is an exemplary schematic view showing an exemplary and non-restricting embodiment of a circuit of a Peltier device (thermoelectric cooler, TEC), derived from https://en.wikipedia.org/wiki/Thermoelectric_effect#Peltier_effect.

In accordance with the invention, the radiation-emitting device 100 of the present invention as schematically shown exemplarily in FIG. 2 (without restricting the invention to the radiation-emitting device 100 of FIG. 2) comprises as its components (to which the present invention is not restricted):

a. at least one radiation source 110 configured to emit radiation of at least one wavelength towards a target 190 or towards a subject 192;

b. at least one space or surface 140 configured to place the target 190 or the subject 192 therein or thereon.

Further components which might be additional or even optional components of the radiation-emitting device of the present invention, for example at least one means 185 configured to control the at last one radiation source's radiation emission towards the target 190 or towards the subject 192, are explained in detail below.

The radiation-emitting device 100 according to the present invention further comprises as another component:

c. at least one dual heating or cooling system 170 configured to heat or to cool the at least one space or surface 140 and comprising at least one Peltier device 171, a non-restricting example of which is shown in FIG. 1, said Peltier device 171 comprising at least two cuboids 172, 172' made of two semiconductor materials having different electron densities, said at least two cuboids 172, 172' being placed thermally in parallel to each other and electrically in series, interconnected with thermally conducting metal bridging plates 173, 173' and sandwiched between a non-conducting material reduced temperature cover plate 174 and a non-conducting material elevated temperature cover plate 174' and configured to be supplied with DC electric current via electrical connections 179;

at least one first heat exchanger 175 thermally connected as a heat source to the Peltier device's 171 reduced temperature cover plate 174;

at least one second heat exchanger 176 thermally connected as a heat sink to the Peltier device's 171 elevated temperature cover plate 174';

at least one fan or fan assembly 177, 178 configured to cause environmental air to flow along the at least one first and/or second heat exchanger 175, 176;

at least one nozzle 180 configured to pass and direct the environmental air flow having passed the at least one first and/or second heat exchanger 175, 176 and heated or cooled towards the at least one space or surface 140 configured to place the target 190 or the subject 192 therein or thereon; and at least one means 181 configured to control the DC electric current supply to the Peltier device 171.

In accordance with the invention, the present radiation-emitting device 100 basically is a radiation-emitting device as broadly, and without restricting the invention, defined above with respect to the components of the radiation-emitting device, with respect to the radiation types and radiation-emitting sources operated in the radiation-emitting device and with respect to the purposes of radiation treatment by such a radiation emitting device. In other words: A skilled person knows radiation-emitting devices 100 of the definition addressed above and, as a part of its general knowledge, may select the components of such radiation-emitting devices 100 in accordance with the requirements of a single case, as far as the components of the radiation-emitting device 100, the radiation types and radiation-emitting sources operated in the radiation-emitting device 100 and the purposes of radiation treatment by such a radiation-emitting device 100 are concerned.

Hence, radiation-emitting devices 100 of the invention (as those of the prior art) may be devices where the subject (for example a person or an animal 192 or any body part(s) thereof) are receiving a radiation treatment in a standing or erect position. Such radiation-emitting devices 100 are usually called "treatment booth" and mostly have an approximate shape of a cylinder with a vertical axis. A subject to be treated may gain access to the treatment booth through a door-like opening, which is opened for the access or leaving by the subject and remains closed during the radiation treatment. The person standing within the inner cylinder-shape space may receive the radiation treatment at all body parts (or at single body parts or at a plurality of body parts), while being in a standstill position or while moving around its own vertical axis.

Also known from the prior art (and also examples of radiation-emitting devices 100 covered by the present invention) are radiation-emitting devices 100 where a person receives a treatment for the whole body or for single parts of the body or for a plurality of parts of the body in a position sitting on a bench or seat in front of a radiation-emitting installation. Such radiation-emitting devices are often employed for irradiating certain parts (e. g. the face, the arms, the upper body) of the subject to be treated.

Radiation-emitting devices of a different type are adapted in their shape and construction to the habit of subjects (e. g. persons wanting to receive a radiation treatment) to receive such a radiation treatment in a recumbent position, i. e. lying on a "treatment bed", specifically on a radiation-permeable (e. g. acrylic) surface. A full body radiation treatment is achieved by either turning all body parts towards the radiation emitted from radiation sources installed below the radiation-permeable surface or by providing the "treatment bed" with a movable canopy also provided with radiation-emitting radiation sources above another radiation-permeable (e. g. acrylic) protection plate, thereby creating a so-called "treatment space" or "treatment tunnel", wherein the subject or person 192 to be radiation-treated is placed, thereby allowing a simultaneous treatment of substantially all sides of the subject's body.

Without restricting the invention to such an embodiment, the dual heating or cooling system 170, 200 of the present invention is exemplarily explained along the "treatment bed" embodiment, which also is exemplarily shown in FIG. 2, without restricting the invention to such an embodiment.

In accordance with the present invention, the radiation-emitting device 100 comprises, as one of its components, at least one radiation source 110 configured to emit radiation of at least one wavelength towards a target 190 or towards a subject 192. Usually, at least a part of the radiation sources 110, in addition to emitting radiation in the form of light of any wavelength or any wavelength range or any wavelength band, such radiation sources 110 emit energy in form of heat. As defined above, and dependent upon the radiation technology used and the radiation wavelength(s) desired or required for the radiation treatment, the radiation-emitting device 100 may comprise, as the radiation-emitting source, high-pressure lamps, medium pressure lamps, low-pressure lamps configured to emit radiation of one or two or several wavelengths, wavelength ranges or wavelength bands of the UV, visible and IR radiation ranges, and/or LEDs in the form of single LEDs or LED arrays (i. e. LEDs configured to emit radiation of one or two or several wavelengths, wavelength ranges or wavelength bands of the UV, visible and IR radiation ranges), or may comprise combinations of the afore-mentioned radiation-emitting sources. In FIG. 2, the radiation sources bearing the reference numeral "110" may be positioned in the lower "bed" part and/or in the upper canopy part of the treatment bed of the radiation-emitting device 100.

In accordance with the present invention, the radiation emitting device 100 comprises at least one radiation source 110 configured to emit radiation of at least one wavelength towards a target (190, not shown) or towards a subject 192 (shown in FIG. 2). Optionally, the radiation device may comprise more than one radiation source 110, for example (without restriction) two radiation sources 110, three radiation sources 110, several radiation sources 110, for example in FIG. 2: six radiation sources, or even more radiation sources.

In the case of several radiation sources 110, the plurality of radiation sources 110 may be configured to emit radiation of the same wavelength or wavelength range or wavelength band or may be configured to emit radiation of different wavelengths or of different wavelength ranges or of different wavelength bands.

Moreover, in the case of more than one (e. g. a plurality of) radiation sources 110, the plurality of radiation sources 110 may all be of the same type (e. g. low pressure lamps or high pressure discharge lamps or LEDs). Alternatively, the plurality of radiation sources 110 may be of different types, e. g. high-pressure discharge lamps for irradiating the subject's face and low pressure lamps for irradiating the subject's body, or high-pressure discharge lamps for irradiating the subject's face, LEDs for irradiating the subject's shoulder and low-pressure lamps for irradiating the subject's body.

Non-restricting and exemplary embodiments of the invention relate to radiation-emitting devices 100 which comprise one or more than one, e. g. a plurality of, radiation source(s) emitting radiation of one or more than one emission wavelength(s) or of one or more emission wavelength range(s) or of one or more emission wavelength band(s) selected from the wavelength(s) of the UV (UV-C, UV-B and/or UV-A) wavelength range (e. g. for the initiation of a generation of Vitamin D3 in the skin from its precursors; for tanning the skin), from the visible wavelength(s) range (e. g. for a number photodynamic therapy applications; for the generation of elastin, keratin and hyaluronic acid in the skin), and from the wavelength(s) of the IR wavelength range (e. g. also for the generation of elastin, keratin and hyaluronic acid in the skin), without restricting the invention to those.

In a further embodiment of the invention which may be realized alone or in combination with one other feature of the invention or with two other or several other features of the invention or with all other features of the invention, without restricting the invention, the radiation-emitting device 100 may further comprise at least one means 185 configured to allow controlling the at least one radiation source's radiation emission towards the target 190 or towards the subject 192. In view of the (generally) health-related aspects of radiation treatments and controlling the radiation emission of one or several radiation sources 110 onto a human being or subject 192 or person to be treated by radiation treatment, such control means 185 are preferred and are (at least in part) not committed to the subject or person 192 to be treated for the control step. In practice, some control steps using the control means 185, if present, may be providable as selectable, at least to a minor extent, to the user (as, for example, the radiation wavelength), while some other control steps are providable as being automated or controlled by computer programs of the radiation-emitting device 100 (as, for example, but not restricting the invention, an adjustment of radiation treatment duration and radiation treatment frequency as well as the adjustment of the radiation intensity to the user's body condition and health status). The majority of control has to be devised to supervisors or physicians, particularly in cases of medical radiation treatment. In practically applicable embodiments, such control means may include sensors of the user's body skin status, sensors of the wavelength, intensity and dose of radiation applied during one treatment and other well-known control means.

In a further embodiment of the invention which may be realized alone or in combination with one other feature of the invention or with two other or several other features of the invention or with all other features of the invention, without restricting the invention, the radiation-emitting device 100 may further comprise at least one filter 120. Filters 120 in radiation-emitting devices 100 are well-known to a skilled person in this technical field and may be selected, with respect to their types, their constitution and their properties on accordance with the requirements to be observed in a single case. In the radiation-emitting device 100 of the present invention, one filter 120 may be employed. In a further preferred embodiment, the radiation-emitting device 100 may comprise two filters 120 or three filters 120 or four filters 120 or even more filters 120, e. g. (without restriction) one filter 120 per radiation source 110 used for emitting radiation. Such filters in general, and the filter(s) 120 of the radiation-emitting device 100 of the present invention especially, is/are configured to allow passing of the radiation sources' emitted radiation of substantially such a wavelength or of substantially such wavelengths or of substantially a wavelength range or wavelength band only which is desired or required, e. g. (without restriction) which serve(s) the intended purpose of radiation.

Exemplarily, and in a further preferred embodiment which may be realized alone or in combination with one other feature of the invention or with two other or several other features of the invention or with all other features of the invention, without restricting the invention, the filter(s) 120 may serve to filter out radiation (emitted by the radiation source(s) 110) which is (a) below or (b) above or (c) below and above a certain wavelength (so-called long-pass filter (a) or so called short-pass filter (b) or so-called bandpass filter (c)). Such filters are exemplified (but not restricted) by (a) a filter 120 to filter out all radiation emitted by a radiation source 110 which is at wavelengths of 500 nm or lower, i. e. in the UV range; or are exemplified by (b) a filter 120 to filter out all radiation emitted by a radiation source 110 which is at wavelengths of 1000 nm or higher, i. e. beyond the near-IR range; or are exemplified by (c) a filter 120 to filter out all radiation emitted by a radiation source 110 which is in the UV and IR wavelength ranges and, hence, allows to pass only light of the visible wavelength radiation range. Of course, also one other filter 120 or other filters 120 may be present in the radiation emitting device 100 of the present invention and may be selected by a skilled person in accordance with the requirements of a single case.

Similarly, a skilled person is familiar with the position of the one or several filter(s) 120 in the radiation-emitting device 100 of the present invention. As usual, such a filter 120 is (or such filters 120 are) positioned in the optical path of the emitted radiation between radiation source 110 and the target 190 or the subject 192. In some embodiments (not restricting the invention), the filter 120 may be a part of (i. e. may be physically combined with) the radiation source 110.

The filtering function of the filter 120 is usually achieved by coating a radiation-transmissible carrier material with a suitable coating effecting the desired filtering function. It is within the skill of a person familiar with the present field of the art to select the filter coating in accordance with the requirements of a single case.

Moreover, a filter 120 as a component of the radiation-emitting device 100 of the invention may be additionally provided with further auxiliary means suitable for allowing the filter(s) 120 to best complete its/their duty. One example is a temperature-adjusting device, e. g. a cooling device, configured to establish a filter temperature best suitable for achieving a satisfactory filtering process. Also in this case, a person skilled in the present technical field may select such auxiliary means, i. e. a temperature-adjusting device, e. g. a cooling device, for the filter 120 in accordance with the requirements of a single case. In a further embodiment of the invention which may be realized alone or in combination with one other feature of the invention or with two other or several other features of the invention or with all other features of the invention, without restricting the invention, the filter temperature may be adjusted and/or controlled by a heating or cooling system 170 of the present invention (as described in detail below).

In a further embodiment of the invention which may be realized alone or in combination with one other feature of the invention or with two other or several other features of the invention or with all other features of the invention, without restricting the invention, the radiation-emitting device 100 of the present invention may comprise at least one reflector 130. Reflectors 130 in radiation-emitting devices 100 are well-known to a skilled person in this technical field and may be selected, with respect to their types, their constitution and their properties on accordance with the requirements to be observed in a single case. In the radiation-emitting device 100 of the present invention, one reflector 130 may be employed. In a further preferred embodiment, the radiation-emitting device 100 may comprise two reflectors 130 or three reflectors 130 or four reflectors 130 or even more reflectors 130, e. g. (without restriction) one reflector 130 per radiation source 110 used for emitting radiation. Such reflectors in general, and the reflector(s) 130 of the radiation-emitting device 100 of the present invention especially, is/are configured to direct and/or to collimate the radiation sources' emitted radiation, or reflected parts thereof, towards the target 190 or towards the subject 192.

A skilled person is familiar with the position of the one or several reflector(s) 130 in the radiation-emitting device 100 of the present invention. As usual, such a reflector 130 is (or such reflectors 130 are) positioned in the optical path of the emitted radiation between radiation source 110 and the target 190 or the subject 192. In some embodiments (not restricting the invention), the reflector 130 may be a part of (i. e. may be physically combined with) the radiation source 110.

The reflecting function (reflection) of the reflector 130 is usually achieved by coating a radiation-transmissible carrier material with a suitable coating achieving the desired reflection function. Depending upon the reflector coating and the reflector carrier material, the reflector 130 may allow a part of the radiation impinged thereon to pass the reflector material, and another part of the impinged radiation emitted by the radiation source 110 is appropriately reflected. It is within the skill of a person familiar with the present field of the art to select the reflector coating in accordance with the requirements of a single case.

Moreover, a reflector 130 as a component of the radiation-emitting device 100 of the invention may be additionally provided with further auxiliary means suitable for allowing the reflector(s) 130 to best complete its/their duty. One example is a temperature-adjusting device, e. g. a cooling device, configured to establish a reflector temperature best suitable for achieving a satisfactory reflection process. Also in this case, a person skilled in the present technical field may select such auxiliary means, i. e. a temperature-adjusting device, e. g. a cooling device, for the reflector(s) in accordance with the requirements of a single case. In a further embodiment of the invention which may be realized alone or in combination with one other feature of the invention or with two other or several other features of the invention or with all other features of the invention, without restricting the invention, the reflector temperature may be adjusted and/or controlled by a heating or cooling system 170 of the present invention (as described in detail below).

In accordance with the present invention, the radiation-emitting device 100 comprises at least one space or surface 140 configured to place or accommodate therein or thereon the target 190 or the subject 192.

The term "subject", as used in the present specification and claims, is understood to mean—synonymously—the subject to which or to whom the radiation emitted by the radiation-emitting device is directed finally. In the majority of cases considered by the present invention (but not exclusively), the subject 192 is a human or an animal, in most of the cases a human person, as exemplarily shown schematically in FIG. 2. As explained above, and as exemplarily also shown in FIG. 2 with respect to the radiation-emitting device 100, the radiation-emitting device 100 comprises (i. e. is provided with) at least one space or surface 140 configured to place or accommodate the subject or person 192.

In the example of a treatment booth (as mentioned above), the subject or person 192 is enters into (and for the radiation treatment is accommodated within) the (more or less) closed cylindrical space surrounded by the radiation sources 110 and their appliances. The subject or person 192 to be irradiated is in a standing position usually and either may stand still or turn around the own (vertical) axis while being subjected to the radiation treatment.

As shown in FIG. 2 exemplarily, in case of the radiation-emitting device in the shape of a treatment bed, in the exemplary case of FIG. 2 also including the canopy for radiation treatment simultaneously from below and from above, the subject or person 192 is placed on the surface 140 of the lower part of the treatment bed, more specifically is accommodated on the light-transmissive upper (acrylic material) surface 140 above the radiation sources 110 of the lower treatment bed part, and is placed below the surface 140 of the upper (canopy) part of the treatment bed, more specifically is accommodated below the light-transmissive lower (acrylic material) surface 140 below the radiation sources 110 of the canopy part of the treatment bed. Hence, the lower and upper parts of the treatment bed form a type of radiation treatment space (or tunnel) 140 surrounding the subject 192 to be treated.

In accordance with the present invention and for achieving the objects of the invention, the radiation-emitting device 100 further comprises at least one dual heating or cooling system 170, 200 configured to heat or to cool the at least one surface 140 or space 140 where the subject 192 to be treated is placed or accommodated, and/or to heat or cool any of the appliances of the radiation-emitting device 100, e. g. one or more filter(s) 120 and/or to heat or cool one or more reflectors 130, and/or to heat or cool the subject or person 192 directly, by means of an air flow heated or cooled by passing an air flow, for example an environmental air flow, along the at least one first and/or second heater 175, 176 and by directing such a heated or cooled air flow to the subject/person 192 to be treated, or treated, by radiation generated by the radiation-emitting radiation sources of the radiation-emitting device 100 of the invention.

The term "dual heating and cooling system" as used in the present specification and claims is understood to mean a system which is configured to serve one dual purpose simultaneously, namely the system either may act as a heating device or may act as a cooling device. Which action, either heating action or cooling action, is performed, depends upon how the Peltier device comprised by the dual heating and cooling system 170, 200 of the invention is supplied with DC electrical current via the electrical connections 179 thereof. FIG. 4 shows one of the possible circuits of a Peltier device 171, where the voltage source with the positive (+) and negative (−) terminals indicates the direction of the current flow in the Peltier device. The current flow in the Peltier device 171 might be reversed by exchanging the positive (+) against the negative (−) terminal and vice versa in FIG. 4, thereby making the elevated temperature cover plate 174' of the Peltier device 171 dissipating heat to the reduced temperature cover plate 174 of the Peltier device 171 and vice versa.

In accordance with the present invention, the dual heating or cooling system 170, 200 comprised in the radiation-emitting device 100 comprises, as one component, a Peltier device 171 (also called thermoelectric cooler, TEC).

In a further embodiment of the invention which may be realized alone or in combination with one other feature of the invention or with two other or several other features of the invention or with all other features of the invention, without restricting the invention, the dual heating or cooling system 170, 200 comprised by the radiation-emitting device 100 of the invention may comprise two, three, four or even more Peltier devices 171. Such a plurality of Peltier devices 171 may serve the same purpose, e. g. heating or cooling the space or surface(s) 140 where, or whereon, the subject or person 192 is placed, or may serve different purposes, e. g. heating or cooling the space or surface(s) 140 where, or whereon or where-under, the subject or person 192 is placed, e. g. heating or cooling the protection (e. g. acrylic material) layer on which the person 192 is lying or heating or cooling the protection (e. g. acrylic material) layer of the upper canopy part of the treatment bed under which the person 192 is lying, or heating or cooling the person 192 treated directly, and heating, or cooling the filter(s) 120 and/or the reflectors 130 accommodated in the radiation-emitting device 100. A skilled person may select, on the basis of his/her knowledge and in accordance with the requirements of a single case, the number of, and mounting place for, the one or the plurality of Peltier devices 171.

Non restricting examples are: In the canopy part of the radiation-emitting device 100 of the invention, there may be mounted one Peltier device per nozzle directing a heating or cooling air flow towards the subject's body, e. g. from an air-conditioning channel in the canopy's middle section towards the treatment tunnel or to the person 192 treated directly; or in the bed part of the radiation emitting device 100, there may be mounted several (e. g. two or three or four) Peltier devices in order to make the temperature adjustment and control for the acrylic support layer more effective; or two or three Peltier devices may be mounted in series for a better heating or cooling efficiency. As a further example, the radiation-emitting device 100 may be operated in a mode including a centrally mounted body temperature-conditioning means which is providable with one Peltier device 171 or a plurality of Peltier devices 171 for improving the heating (or cooling) efficiency. In so far (and as described below), the embodiment shown in FIG. 2 and showing (see the arrows) blowing heated (or cooled) air into the treatment tunnel 140 by means of nozzles 180 (and towards the person 192 lying in the treatment tunnel 140) is to be considered as an example for better understanding of the invention, only: Other temperature conditioning means may likewise be used in order to provide the heated (or cooled) temperature-conditioning air flow to the person 192 in the treatment tunnel or on the treatment bed surface or to the treatment surface itself.

In the following, the Peltier device 171 is described in more detail while referring to FIGS. 1 and 4. The Peltier device 171 comprises at least two cuboids 172, 172' made of two different semiconductor materials having different electron densities. In preferred embodiments of the invention which may be realized alone or in combination with one other feature of the invention or with two other or several other features of the invention or with all other features of the invention, without restricting the invention, and as also shown exemplarily in FIG. 1, without restricting the invention, the number of cuboids 172, 172' may be larger than 2, and the cuboids 172, 172' more preferably are present in a larger number, but are used in pairs in the Peltier device 171. In an even more preferred embodiment (and as shown in FIG. 1 exemplarily) the number of cuboids 172, 172' of the Peltier device is 45, but the number may be smaller or larger, as is recognized by a skilled person in this field.

The cuboids 172, 172' are made of two different semiconductor materials having different electron densities. In further embodiments of the invention which may be realized alone or in combination with one other feature of the invention or with two other or several other features of the invention or with all other features of the invention, without restricting the invention, the two semiconductor materials of the Peltier device's cuboids 172, 172' are semiconductors of the n-type, on the one hand, and are semiconductors of the p-type, on the other hand. In even more preferred embodiments, the Peltier device's cuboids 172, 172' are made of, or comprise, bismuth telluride, as one semiconductor material on the one hand, and silicon germanium, as another semiconductor material on the other hand. The skilled person in this technical field is familiar with Peltier device semiconductor materials and may select them in accordance with the specific requirements of a single case from known n-type and p-type semiconductor materials having different electron densities.

As can be seen from the exemplary representation of FIG. 1, the at least two cuboids 172, 172' or the paired cuboids 172, 172' of the larger number of cuboid-shaped semiconductor bodies in the Peltier device 171 are placed thermally in parallel to each other and electrically in series, and are interconnected, preferably one by one in pairs, with thermally conducting metal bridging plates 173, 173' so that the bridging plates 173, 173' connect the cuboids' top and bottom sides in series (i. e. consecutively), thereby creating heat-conductive surfaces on the top and bottom sides of the cuboids 172, 172'.

The semiconductor cuboids 172, 172' with their top and bottom thermally conducting metal bridges 173, 173' are sandwiched between a non-conducting material upper (or lower) reduced temperature cover plate 174 and a non-conducting material lower (or upper) elevated temperature cover plate 174' covering both sides of the semiconductor cuboid array. Which cover plate (the reduced temperature cover plate 174 or the elevated temperature cover plate 174') is the upper (or lower) one depends on the DC electric current flow direction. The semiconductor cuboid array is connectable to a DC electrical power supply via electrical connections 179. Hence, the Peltier device 171 is configured to be supplied with DC electric current.

In accordance with the present invention, the dual heating or cooling system 170, 200 comprised in the radiation-emitting device 100 comprises, as further components, at least one heat exchanger 175 thermally connected as a heat source to the Peltier device's 171 reduced temperature cover plate 174; and at least one heat exchanger 176 thermally connected as a heat sink to the Peltier device's 171 elevated temperature cover plate 174'. The number of heat exchangers may be one for each of the purposes (heat source and heat sink), but is not restricted to two heat exchangers 175, 176 altogether. In a preferred embodiment of the radiation-emitting device 100, the dual heating or cooling system 170, 200 comprises two heat exchangers.

The heat exchangers 175 and 176, preferably the two heat exchangers 175, 176, may be conventional heat exchangers known to a skilled person for the purpose of exchanging heat between liquid and gaseous media carrying heat. An exchange of heat between the one or more first heat exchanger(s) 175 and the one or more second heat exchanger(s) 176, on the one hand, and the Peltier devices reduced temperature and elevated temperature cover plates 174 and 174' may be effected on a conventional "route", e. g. by direct contact of the respective surfaces having different temperature levels, or on any other route known to a skilled person for a temperature exchange. In a preferred embodiment of the present invention which may be realized alone or in combination with one other feature of the invention or with two other or several other features of the invention or with all other features of the invention, without restricting the invention, the heat exchange between the heat exchangers 175 and 176 on the one hand and the Peltier device's reduced temperature cover plate 174 and the Peltier device's elevated temperature cover plate 174', on the other hand, is effected via heat pipes. Heat pipes are well known to a skilled person in the field of highly efficient heat transfer and have the advantages of high efficiency and reliability in transferring heat, require a minimum, only, of space for accommodating the heat transfer components due to the fact that the heat uptake (from the device or appliance to be cooled and heat dissipation or release to the environment may be distant from each other, and develop a surprisingly low level of noise of operation due to the fact that no moving parts are involved.

In a further embodiment of the invention which may be realized alone or in combination with one other feature of the invention or with two other or several other features of the invention or with all other features of the invention, without restricting the invention, and as shown in FIG. 3 as a specific example, without restricting the invention by such an explanation and reference to FIG. 3, the at least one heat exchanger 175 is thermally connected as a heat source to the Peltier device's 171 reduced temperature cover plate 174 by at least one heat pipe, preferably more than one heat pipe. In a different, alternative, embodiment also shown in FIG. 3 as a specific example, without restricting the invention by such an explanation and reference to FIG. 3, the at least one second heat exchanger 176 is thermally connected as a heat sink to the Peltier device's 171 elevated temperature cover plate 174' by at least one heat pipe 182, preferably more than one heat pipe 182. For this explanation, it is supposed that the heat sink heat exchanger is the one indicated in FIG. 3 with the reference numeral "176", and its "dissipated" heat is blown with the air flow caused by fan 177 into the nozzle 180 and used for a heating step of the radiation-emitting device's radiation treatment space or treatment surface 140 or for warming up/heating the subject or person 192 directly.

The circuit for the Peltier device 171 for this embodiment is shown in FIG. 4. By changing the DC electric current supply to the Peltier device via the DC electric current supply control means 181, the heating/cooling properties of the dual heating or cooling system 170, 200 of the radiation-emitting device 100 of the present invention can easily be reversed. Hence, practically, the radiation-emitting device's radiation treatment space or treatment surface 140 or, directly, the subject/person 192 treated can conveniently be cooled or warmed up/heated.

In a further embodiment of the invention which may be realized alone or in combination with one other feature of the invention or with two other or several other features of the invention or with all other features of the invention, without restricting the invention, in a similar manner as described above and in view of the requirements in the cooling mode, a temperature adjustment may be provided for one or a plurality or the whole of the electronic appliances of a radiation-emitting device 100 which are components of the radiation-emitting device 100 and emit larger amounts of heat during the device's operation. This is similarly to radiation-emitting lamps, as for example high-pressure discharge lamps or LEDs, particularly LEDs mounted in larger LED arrays. In view of the restricted space available for mounting effective cooling devices of the conventional design in close proximity to the heat-emitting lamps or LEDs/LED arrays, providing Peltier devices, particularly in combination with heat pipes transporting the heat generated by the lamps/LEDs away from the lamps to distant Peltier devices of dual heating or cooling systems 170, 200 of the invention is highly advantageous: Cooling can be provided despite the restricted space in the proximity of the lamps 110 operated in the radiation-emitting devices 100, and the service life of the radiation-emitting lamps 110 is largely extended.

According to the present invention, the dual heating or cooling system 170, 200 comprised in the radiation-emitting device 100 comprises, as a further component, at least one fan or fan assembly 177, 178. There may be one fan 177, or there may be a plurality of fans 177, 178 or fan assembly of two, three or even more fans 177, 178, depending upon the requirements of the specific radiation-emitting device 100 and the comprised dual heating and cooling system 170, 200. In a preferred embodiment of the present invention which may be realized alone or in combination with one other feature of the invention or with two other or several other features of the invention or with all other features of the invention, without restricting the invention, there is provided one fan for each heat exchanger 175 and 176, i. e. two fans 177, 178 altogether. The at least one fan or the two fans 177, 178 is or are configured to cause a suitable fluid, in practically preferred embodiments of the invention: environmental air, to flow along the at least one first and/or second heat exchanger or the two (first and second) heat exchangers 175, 176, thereby promoting the heat exchange.

In a further embodiment of the invention which may be realized alone or in combination with one other feature of the invention or with two other or several other features of the invention or with all other features of the invention, without restricting the invention, the at least one fan or the plurality of fans, preferably the two fans 177, 178 causing environmental air to flow along the heat exchanger(s) 175, 176, comprises or comprise at least one radial fan (also called radial blower or centrifugal blower). Preferably, all fans, preferably the two fans 177, 178 used in the dual heating or cooling system 170, 200 of the radiation-emitting device 100 of the present invention are radial fans. Radial fans are preferred because they usually combine an axial cooling medium intake or environmental gas intake with a centrifugal medium (or gas) exhaust. Due to such a construction, the radial fans require only narrow spaces for their installation, thereby saving space for an accommodation of the overall dual heating or cooling system 170, 200.

In accordance with the present invention, the dual heating or cooling system 170, 200 comprised in the radiation-emitting device 100 comprises, as a further component, at least one nozzle 180. The dual heating or cooling system 170, 200 comprised by the radiation-emitting device 100 of the invention may comprise one nozzle 180 or may comprise two, three, four or even more nozzles 180. In preferred embodiments of the dual heating or cooling system 170, 200 of the invention, there are provided one nozzle 180 or two nozzles 180, practically preferred one nozzle 180 or one nozzle 180 for each of the heat exchanger/fan combinations, i. e. two nozzles 180, 180 altogether. The nozzle 180 or the nozzles 180 are configured to pass, and direct, the environmental medium flow or environmental air flow caused by the at least one fan or the plurality of fans or the two fans 177, 178 to flow along the first and/or second heat exchangers 175, 176 towards the at least one surface or space 140 configured to place the target 190 or the subject 192 therein or thereon.

This is further explained in detail by referring to FIGS. 2 and 3. First and second heat exchangers 175, 176 may act as heat sources and heat sinks reciprocally (FIG. 3). Both heat exchangers, i. e. the first heat exchanger 175 and the second heat exchanger 176 (FIG. 3), and similarly their assigned fans 177, 178 (FIG. 3) and their assigned nozzles 180, 180 (FIG. 3), are components of the dual heating or cooling system 170, 200 (FIG. 2, reference numeral: 170). In FIG. 3, the nozzle 180 is shown to receive the environmental air flow (comprising the hot air) (dashed arrows in FIG. 3) blown along the (heat sink) heat exchanger 176 into the nozzle 180 by the fan 177. FIG. 2 shows two dual heating and cooling systems 170, of which one is accommodated in the lower part of the radiation-emitting device 100 and the other one is accommodated in the canopy of upper part of the radiation-emitting device 100. The two dual heating or cooling systems 170 are shown in FIG. 2 to be (schematically) connected to four respective nozzles 180 at the head sections and foot sections of the lower and (canopy) upper parts of the radiation-emitting device 100. The heating (or, alternatively, the cooling) air blown to the nozzles is shown in FIG. 2 (arrows: ⇨) to be supplied to the surface or space 140 on which, or within which, the subject 192 is lying.

The supply of heating (or, alternatively, of cooling) air onto the surface(s) 140 or into the space 140, or onto the target 190 or onto the subject/person 192 directly, may be effected in any direction technically possible: The heating (or alternatively: the cooling) air may be supplied by the nozzles (as shown in FIG. 2) along the longitudinal axis of the radiation emitting device's or along a direction in the same longitudinal plane, but perpendicular (or in any angle different from 90°) to the longitudinal axis. In a different embodiment of the invention, the heating (or alternatively: the cooling) air may be blown into the (tunnel-shape) space 140 through small slits running laterally to the side edges or head and/or foot sections of the lower and/or upper (canopy) part of the radiation-emitting device or may be blown into the space 140 or towards the person 192 from a nozzle or a plurality of nozzles 180 entering into the tunnel-shape space 140 approximately and exemplarily orthogonally (seen from the head or foot ends of the tunnel 140) and at an inclination α of 30≤α≤60 degrees relative to the lower protection plate of the canopy. In one of the latter embodiments, lost heat of the radiation sources 110 may preferably be used to support a heating step, or alternatively, effective cooling of the person 192 may be provided.

According to the present invention, the dual heating or cooling system 170, 200 comprised in the radiation-emitting device 100 comprises, as a further component, at least one means 181 configured to control the DC electric current supply to the Peltier device 171. An example of such a control means 181 is shown in FIG. 3, together with the required DC electric power supply connecting wires and Peltier device electric power cables. Usually, and advantageously for the simplicity of the dual heating or cooling system 170, 200 of the radiation emitting device 100 of the invention, one such means for controlling the DC electric power supply to the dual heating or cooling system 170, 200 and changing the direction of the DC electric power supply to the system is sufficient for converting the dual heating system to a dual cooling system.

In a further embodiment of the invention which may be realized alone or in combination with one other feature of the invention or with two other or several other features of the invention or with all other features of the invention, without restricting the invention, the Peltier device 171 is configured to heat or cool a target selected from: the space 140 configured to place a subject or person 192 within, a surface 140 to place a subject or person 192 on or under, the subject or person 192 directly, the radiation-emitting device's radiation-emitting lamps and/or LEDs 110 and the radiation-emitting device's electronic appliances. The at least one first heat exchanger 175 is thermally connected as a heat source to the Peltier device's 171 reduced temperature cover plate 174 by at least one heat pipe 182, preferably more than one heat pipe 182. In a different, alternative, embodiment also shown in FIG. 3 as a specific example, without restricting the invention by such an explanation and reference to FIG. 3, the at least one second heat exchanger 176 is thermally connected as a heat sink to the Peltier device's 171 elevated temperature cover plate 174' by at least one heat pipe 182, preferably more than one heat pipe 182. For this explanation, it is supposed that the heat sink heat exchanger is the one indicated in FIG. 3 with the reference numeral "176", and its "dissipated" heat is blown with the air flow caused by fan 177 into the nozzle 180 and used for a heating step of the radiation-emitting device's radiation treatment space or treatment surface 140 or for warming up/heating the subject or person 192 directly. The circuit for the Peltier device 171 for this embodiment is shown in FIG. 4. By changing the DC electric current supply to the Peltier device via the DC electric current supply control means 181, the heating/cooling properties of the dual heating or cooling system 170, 200 of the radiation-emitting device 100 of the present invention can easily be reversed. As a consequence, heat-emitting radiation sources or lamps or LEDs 110 or heat-emitting electronic appliances as components of radiation-emitting devices 100 can efficiently be cooled by changing the DC electric current supply to the Peltier device via the DC electric current supply control means 181.

In a further embodiment of the invention which may be realized alone or in combination with one other feature of the invention or with two other or several other features of the invention or with all other features of the invention, without restricting the invention, the Peltier device 171 is configured to heat or cool a target selected from: the space 140 configured to place a subject or person 192 within; a surface 140 to place a subject or person 192 on or under; the subject or person 192 directly; a radiation-emitting and heat-emitting radiation source 110 mounted in said radiation-emitting device 100; and electronic appliances useable to operate said radiation-emitting device 100.

The invention also relates to the dual heating or cooling system 170, 200 itself.

The dual heating or cooling system 170, 200 of the invention comprises
  at least one Peltier device 171;
  at least one first heat exchanger 175 thermally connected as a heat source to the Peltier device's 171 reduced temperature cover plate 174;
  at least one second heat exchanger 176 thermally connected as a heat sink to the Peltier device's 171 elevated temperature cover plate 174';
  at least one fan or fan assembly 177, 178 configured to cause environmental air to flow along the at least one first and/or second heat exchanger(s) 175, 176;
  at least one nozzle 180 configured to pass and direct the environmental air flow having passed the at least one first and/or second heat exchanger 175, 176 and heated or cooled towards a target; and
  at least one means 181 configured to control the DC electric current supply to the Peltier device 171.

For a description of the details of the above components of the dual heating or cooling system 170, 200 of the invention and of the preferred embodiments and alternatives thereof, reference is made to the above description, and all such details and preferred embodiments are also applicable to, and claimed for, the description and claims to the dual heating or cooling system 170, 200 itself.

The invention also relates to the use of a dual heating or cooling system 170, 200 as described above and claimed, in a radiation-emitting device 100 for providing alternatingly heating or cooling to at least one space or surface 140 of a radiation-emitting device 100 configured to place a target 190 or a subject 192 therein or thereon intended to be subjected to radiation. Such a use of the dual heating or cooling system 170, 200 was in detail described above, together with a description of preferred embodiments thereof, and for the details of the use of the dual heating or cooling system 175, 200 of the invention in relation to radiation-emitting devices 100, reference is made to the above description, and all such details and preferred embodiments are also applicable to, and claimed for, the description and claims to the use of the dual heating or cooling system 170, 200 in radiation-emitting devices 100.

In a further embodiment of the invention which may be realized alone or in combination with one other feature of the invention or with two other or several other features of the invention or with all other features of the invention, without restricting the invention, the use of the dual heating or cooling system 170, 200 of the invention in radiation-emitting devices 100 preferably comprises: heating at least one space or surface 140 of a radiation-emitting device 100 by operating the dual heating or cooling system 170, 200 through supplying DC electric current to the electrical connections 179 of the Peltier device 171 and dissipating the heat from the elevated temperature cover plate 174' of the Peltier device 171 to the radiation-emitting device 100; and cooling at least one space or surface 140 of a radiation-emitting device 100 by operating the dual heating or cooling system 170, 200 through supplying DC electric current to the electrical connections 179 of the Peltier device 171 in a current flow direction opposite to the flow direction of the heating step and transferring the heat from the radiation-emitting device 100 to the reduced temperature cover plate 174 of the Peltier device 171.

Finally, the invention relates to a method of alternatingly heating or cooling areas or parts of a radiation-emitting device 100 before, during or after a radiation-emitting operation of said radiation-emitting device 100, said method comprising the alternative steps:

a. of heating at least one space or surface 140 a radiation-emitting device 100 by operating a dual heating or cooling system 170, 200 as described in detail in the above specification and as claimed, and comprised by said radiation-emitting device 100, through supplying DC electric current to the electrical connections 179 of the Peltier device 171 and dissipating the heat from the elevated temperature cover plate 174' of the Peltier device 171 to the radiation-emitting device 100; or b. of cooling at least one space or surface 140 of a radiation-emitting device 100 by operating a dual heating or cooling system 170, 200 as described in the above specification in detail and as claimed, through supplying DC electric current to the electrical connections 179 of the Peltier device 171 in a current flow direction opposite to the flow direction of the heating step and transferring the heat from the radiation-emitting device 100 to the reduced temperature cover plate 174 of the Peltier device 171.

As described above in detail, the radiation-emitting device 100 comprising at least one dual heating or cooling system 170, 200 of the invention, as well as the dual heating or cooling system 170, 200 of the invention and its use in a radiation-emitting device 100 for providing alternatingly heating or cooling to at least one space or surface or appliance of the radiation-emitting device 100, as well as the method of alternatingly heating or cooling areas or parts of a radiation-emitting device 100 before, during or after a radiation-emitting operation of said radiation-emitting device 100 achieve a number of striking advantages over the prior art.

Alternating steps of heating or cooling the treatment space or treatment surface or parts of a radiation-emitting device can be effected by the same system allowing a dual heating or cooling mode operation dependent upon the physical operation conditions (direction of current flow) of the system. The desired temperature control and temperature adjustment can be effected more promptly and more exactly than in customary systems. The efficiency can be improved by generating just that heating (or cooling) efficiency required under the circumstances and by "transporting" the heat along distances only such short that heat losses can be avoided. Moreover, the dual heating or cooling system provided is small enough to be installed in narrow spaces and is not as voluminous as conventional heat-conditioning (heating or cooling) devices. Hence, construction designers have more freedom in positioning a required heating or cooling system.

Surprisingly, in body irradiation devices, the temperature of the radiation treatment space or surface can be adjusted to be comfortable for the user of the device before the start of the irradiation procedure with a straightforward and energy efficient installation. Even more, an excess heat generated by the irradiation sources in the course of the irradiation procedure is dissipated easily by an efficient cooling device.

Having described the present invention in detail above, together with addressing the preferred embodiments of the invention and referring to the Figures also referring to preferred embodiments of the invention, the advantages of the invention are apparently that several disadvantages of the temperature management of radiation sources in the treatment space or on the treatment surface of radiation-emitting devices can be remedied. As a skilled person will recognize, a temperature of the radiation space or surface comfortable for the user of a body irradiation apparatus can be adjusted before the start of the irradiation procedure with a straightforward and energy efficient heating installation. Moreover, an easy and efficient dissipation of excess heat generated by the radiation sources in the course of the irradiation procedure could be achieved by using the efficient cooling mode of the dual heating or cooling system of the invention.

The invention was described above by referring to the general principles thereof and also describing preferred embodiments of the invention. The scope of the invention is determined by the enclosed claims.

LIST OF REFERENCE NUMERALS

100 Radiation-emitting device
110 Radiation source
120 Filter
130 Reflector
140 Space or surface configured to place the target or subject
170 Dual heating or cooling system
171 Peltier device
172, 172' Semiconductor material cuboids
173, 173' Thermally conducting metal bridging plates
174, 174' Non-conducting material cover plates
175 First heat exchanger (heat source)
176 Second heat exchanger (heat sink)
177 Fan or fan assembly
178 Fan or fan assembly
179 Electrical connections
180 Nozzle
181 DC electric current supply control means
182 Heat pipes
185 Means for controlling radiation source(s)
190 Target
192 Subject or person or animal to be irradiated
200 Dual heating or cooling system

The invention claimed is:

1. A radiation-emitting device, comprising
  a. at least one radiation source configured to emit radiation of at least one wavelength towards a target, the target comprising a body having a head section and a foot section;
  b. at least one space or surface configured to place the target therein or thereon;
    wherein the radiation-emitting device further comprises:

c. at least one dual heating and cooling system configured to heat or to cool the at least one space or surface and comprising
   at least one Peltier device, said Peltier device comprising at leasttwo cuboids made of two semiconductor materials having different electron densities, said at least two cuboids being placed thermally in parallel to each other and electrically in series, interconnected with thermally conducting metal bridging plates and sandwiched between a non-conducting material reduced temperature cover plate and a non-conducting material elevated temperature cover plate and configured to be supplied with DC electric current via electrical connections;
   at least one first heat exchanger thermally connected as a heat source to the Peltier device's reduced temperature cover plate;
   at least one second heat exchanger thermally connected as a heat sink to the Peltier device's elevated temperature cover plate;
   at least one fan or fan assembly configured to cause environmental air to flow along the at least one first and/or second heat exchanger;
   a first nozzle and a second nozzle configured to pass and direct the environmental air flow having passed the at least one first and/or second heat exchanger and thereby heated or cooled towards the at least one space or surface configured to place the target-or the subject therein or thereon, wherein the first nozzle is configured to pass and direct the environmental air to flow towards the head section of the body and the second nozzle is configured to pass and direct the environmental air to flow towards the foot section of the body; and
   at least one circuit board configured to control the DC electric current supply to the Peltier device.

2. The radiation-emitting device according to claim 1, further comprising at least one reflector configured to direct and/or collimate the radiation sources' emitted radiation, or reflected parts thereof, towards the target or towards the subject.

3. The radiation-emitting device according to claim 1, wherein the Peltier device's semiconductor materials comprise semiconductors of the n-type and semiconductors of the p-type; wherein the Peltier device's semiconductor materials comprise or consist of bismuth telluride and silicon germanium; and/or wherein the non-conducting material cover plates comprise or consist of alumina ceramics.

4. The radiation-emitting device according to claim 1, wherein the at least one fan or fan assembly comprises at least one radial fan.

5. The radiation-emitting device according to claim 1, wherein the at least one heat exchanger is thermally connected as a heat source to the Peltier device's reduced temperature cover plate by at least one heat pipe; and/or wherein the at least one heat exchanger is thermally connected as a heat sink to the Peltier device's elevated temperature cover plate by at least one heat pipe.

6. The radiation-emitting device according to claim 1, wherein the Peltier device is configured to heat or cool a target selected from: the space configured to place a subject or person within; a surface to place a subject or person on or under; the subject or person directly; a radiation-emitting and heat-emitting radiation source mounted in said radiation-emitting device; and electronic appliances useable to operate said radiation-emitting device.

* * * * *